(12) United States Patent
Temple et al.

(10) Patent No.: US 6,466,317 B1
(45) Date of Patent: Oct. 15, 2002

(54) AUTOMATIC REAL TIME MONITORING OF TRUE COLOR IN WASTE LIQUIDS

(75) Inventors: Stephen R. Temple, Santa Cruz, CA (US); Michael J. Stoltz, Altoona, PA (US)

(73) Assignee: Steen Research, LLC., West Linn, OR (US)

( * ) Notice: Subject to any disclaimer, the term of this patent is extended or adjusted under 35 U.S.C. 154(b) by 0 days.

(21) Appl. No.: 09/501,346

(22) Filed: Feb. 9, 2000

Related U.S. Application Data
(60) Provisional application No. 60/119,886, filed on Feb. 12, 1999.

(51) Int. Cl.[7] .................................................. G01J 3/42
(52) U.S. Cl. ........................ 356/326; 356/409; 356/402; 356/36
(58) Field of Search .......................... 356/300, 319, 356/326, 328, 402, 36

(56) References Cited

U.S. PATENT DOCUMENTS

| | | | |
|---|---|---|---|
| 3,372,129 A | 3/1968 | Phillips | |
| 3,738,945 A | 6/1973 | Panzer et al. | |
| 3,755,159 A | 8/1973 | Nagy | |
| 3,894,944 A | 7/1975 | Panzer et al. | |
| 3,894,947 A | 7/1975 | Panzer et al. | |
| RE28,807 E | 5/1976 | Panzer et al. | |
| RE28,808 E | 5/1976 | Panzer et al. | |
| 3,975,347 A | 8/1976 | Phillips et al. | |
| 4,112,768 A | 9/1978 | Holland et al. | |
| 4,693,815 A | 9/1987 | Collins, Jr. | |
| 4,956,102 A | 9/1990 | Allsing | |
| 5,143,630 A | 9/1992 | Rolchigo | |
| 5,200,089 A | 4/1993 | Siefert et al. | |
| 5,292,793 A | 3/1994 | Ramesh et al. | |
| 5,314,627 A | 5/1994 | Ramesh et al. | |
| 5,326,479 A | 7/1994 | Sarkar et al. | |
| 5,435,921 A | 7/1995 | Collins et al. | |
| 5,435,922 A | 7/1995 | Ramesh et al. | |
| 5,578,213 A | 11/1996 | Miller et al. | |
| 6,023,065 A | * 2/2000 | Garver, Jr. | 250/372 |

* cited by examiner

Primary Examiner—F. L. Evans
(74) Attorney, Agent, or Firm—Beyer Weaver & Thomas LLP (57) ABSTRACT

In one aspect the current invention provides a method for automatic real time monitoring of true color in a liquid. A sample is automatically withdrawn from the liquid in real time and is then automatically filtered in real time. The true color in the filtered sample is automatically detected in real time and the true color is automatically quantified in the filtered sample in real time. In another aspect, the present invention provides an apparatus that automatically monitors true color in a liquid in real time. The apparatus has a pump for automatically withdrawing a sample from the liquid in real time and a filter for automatically filtering the sample in real time. The apparatus also has an absorption spectrophotometer for automatically detecting true color in the filtered sample in real time and a controller for automatically quantifying the true color of the filtered sample in real time.

18 Claims, 4 Drawing Sheets

AUTOMATIC REAL TIME MONITORING OF TRUE COLOR IN WASTE LIQUIDS

CROSS REFERENCE TO RELATED APPLICATIONS

This patent application claims priority from U.S. Provisional Application No. 60/119,886 filed Feb. 12, 1999, which is incorporated herein by reference.

FIELD OF THE INVENTION

The current invention pertains to automatic real time monitoring of true color in waste liquids such as pulp and paper mill effluents. More specifically, in one aspect the present invention relates to the automated real time detection of true color in effluents with an on line in situ absorption spectrophotometer. In another aspect, the current invention also pertains to the use of aluminum chlorohydrates polymer blends for the removal of color in pulp and paper mill effluents.

BACKGROUND OF THE INVENTION

Wood consists of approximately 45% cellulose, 30% hemi-cellulose, 23% lignins and 2% of a mixture of terpenes, resins and fatty acids. Pulping purifies the cellulose and hemi-cellulose from the other components of wood such as lignins, oils and resins and is integral to paper manufacturing.

Chemical pulping is a preferred method for producing very pure cellulose fibers in paper manufacturing. The most common form of chemical pulping is the Kraft pulping process where materials such as wood chips are heated under pressure with an aqueous solution of sodium hydroxide, sodium carbonate, and sodium sulfide (i.e. pulping liquor) to provide a dark brown pulp. Lignins, which are polymers that bind to hemi-cellulose and provide structural rigidity to wood, are degraded by the heated, pressurized caustic solution, which provides pulp substantially enriched in both cellulose and hemi-cellulose. The Kraft pulping process typically removes about 90 to 95% of the lignin found in naturally occurring wood. The dark brown pulp provided by the Kraft process must be refined by bleaching to remove the remaining lignin to manufacture fine paper.

Further purification of the pulp requires removal of both volatile materials such as terpenes and used pulping liquors. The used pulping liquors, referred to as weak black liquor, typically contain large amounts of organic materials. The weak black liquor is typically evaporated to provide a strong black liquor which contains over 50% solids. The highly concentrated solution of lignin, dissolved organic material and pulping liquor additives is then burned in a liquor recovery furnace. The organic material and the lignins are combusted while the pulping liquor additives may be recovered for reuse.

The concentrated organic material in the strong black liquor causes serious problems when accidentally discharged to a waste treatment facility. Liquor losses negatively affect the waste treatment facility and are environmentally detrimental to the receiving body of water through toxic breakdown effects. Currently, no accurate practical method for automatic in situ real time monitoring of liquor discharge to the waste treatment facility exists. Furthermore, real time methods for treating the liquor based on monitoring also do not presently exist.

Bleaching, typically accomplished with chlorine dioxide and sodium hypochlorite, removes the remaining lignins from the pulp provided by the Kraft process. Bleaching solubilizes lignins, thus imparting a large amount of color to the bleaching solution. The amount of color in a discharged waste stream is generally indicative of the stream's toxicity. Therefore, one focus of current environmental regulations is to regulate the pulping liquor content of the waste streams discharged into public systems and/or waterways. For example, 40 C.F.R. section 430.03 (i.e. the "Cluster"Rule) is particularly applicable to the pulp and paper industry. The color concentration of a liquid is generally referred to as the "true color" of the liquid and is typically measured in platinum cobalt (Pt/Co) units.

The volume of highly colored, degraded lignin and wood sugars within an effluent is substantial when bleaching is performed at an integrated paper mill. Numerous treatment schemes are known to those of skill in the art to reduce the color of the effluent. However they tend to be inaccurate and in most cases do not address the real problem of true color. Existing methods include measuring fluid conductivity; Chemical Oxygen Demand (COD) and Total Organic Carbon (TOC). Experimental testing has revealed a lack of reliable correlation between conductivity, pH, COD, or TOC and color concentration. For example, conductivity is affected by regeneration of plant resin exchange units and the use of salt in the process. Further, the conductivity of bleach plant effluent is low compared to conductivity of strong black liquor due to the concentration of salts during evaporation. COD may be easily misinterpreted for several reasons. First, the various oxidants in the bleaching process severely affect color endpoint COD testing. Second, reproducibility of COD testing in a given environment with color endpoint testing methods is difficult. TOC as an indicator reveals only the entire organic content of an effluent. Because various effluents have significant carbon content, individual effluent impact is difficult to measure quantitatively.

Spectrophotometric techniques are considerably more accurate than the aforementioned methods for measuring the true color of pulp and paper mill effluents. In general, spectrophotometric techniques measure the true color of a filtered sample of the effluent. The true color is affected by a number of factors, but in the pulp and paper industry, true color tends to be most significantly affected by degraded lignin bodies, wood sugars and pulping liquor (i.e. sulfide). Although spectrophotometric techniques are useful, current practices require, significant operator intervention and substantial amounts of time to measure the color of pulp and paper mill effluents. Thus, no real time spectrophotometric technique for automatic in situ monitoring of true color currently exists.

Various methods, well known to those of skill in the art, have been used to reduce true color content of paper and pulp mill effluents. For example, branched or linear epichlorohydrin dimethylamine condensation polymers are known to reduce color, which is indicative of toxic substances, in pulp and paper mill effluents. However, application of these polymers without overfeeding is very difficult. Furthermore, low levels of color are difficult to achieve with these condensation polymers since color frequently resolubilizes over time. A similar problem is observed when polydiallyldimethylammoniumchlorides are used to reduce color content of effluents. Epichlorohydrin condensates in combination with dosages of inorganic salts such as aluminum sulfate or ferrous sulfate in the 300 to 1,000 ppm range also effect color reduction. However, this mixture produces a voluminous amount of sludge and requires the addition of caustic soda to maintain the pH of the effluent at required levels. Currently, no method exists that reduces the color of lignin containing effluents to low levels without producing large amounts of sludge and strongly affecting the pH of the effluent.

In view of the foregoing, it should be apparent that the development of a system capable of detecting the true color of waste effluents in real time is highly desirable. Ideally, the real time color measurement should be coupled with process control to provide efficient real time reduction of true color in effluent streams. New chemistry for reducing color in paper and pulp mill effluents would also be desirable.

SUMMARY OF THE INVENTION

The present invention relates generally to automated, real time monitoring of true color of effluents. The described methods and apparatus are easily implemented and can provide instantaneous information that may be used to comply with environmental regulations and provide rapid and efficient control of true color in effluents.

In one aspect, the current invention provides a method for automatic real time monitoring of true colors in a liquid. A sample is automatically withdrawn from the liquid (such as a waste stream) in real time and is then automatically filtered in real time. The true color in the filtered sample is automatically detected in real time and the true color content is automatically quantified in real time. The automatic real time monitoring of true colors in a liquid allows for mechanical or chemical control of the true color of the liquid and/or process control of the liquid's source, which facilitates control of the true color of the liquid itself. By way of example, such control can be accomplished through automated feed forward or automated feed back processes.

In one embodiment, in-situ absorption spectrophotometry is used to detect the true color in the filtered sample. In a more specific embodiment, the true color is detected by absorption spectroscopy at a wavelength between about 400 nm and about 800 nm. In an even more specific embodiment, the true color is detected by absorption spectroscopy at a wavelength in the range of about 430 to 460, as for example about 455 nm. In some embodiments, the spectrophotometry optics are at least periodically cleaned, as for example by periodically adding a biocide to a sample stream to reduce bio-contamination of the spectrophotometry optics.

In one embodiment, the liquid is pulp mill effluent, bleach plant effluent, paper mill effluent, waste water treatment facility effluent or pre-treatment facility effluent. In another embodiment, the liquid is a receiving body of water at a waste water treatment facility or a pre-treatment facility. In pulp plant applications, the real time control of the true color of the effluent stream may be accomplished by controlling the bleaching operation.

In another aspect, the present invention provides an apparatus that automatically monitors true colors in a liquid in real time. The apparatus has a pump that automatically withdraws a sample from the liquid in real time and a filter that automatically filters the sample in real time. The apparatus also has an absorption spectrophotometer that automatically detects true color in the filtered sample in real time and a controller that automatically quantifies the color of the filtered sample in real time.

In one embodiment, the apparatus also has a acid reservoir, a base reservoir, a controller and a pH measuring device for automatically measuring and adjusting the pH of the sample. In another embodiment, the filter is an automatic self-cleaning filter. In a more specific embodiment, the automatic self-cleaning filter has at least two filter units.

BRIEF DESCRIPTION OF THE DRAWINGS

The invention will be better understood by reference to the following description taken in conjunction with the accompanying drawings in which.

DETAILED DESCRIPTION OF THE PREFERRED EMBODIMENTS

The invention will now be more fully described with reference to the accompanying drawings. To facilitate explanation, the invention will be described primarily in the context of a particular embodiment where the true color of a waste water stream such as pulp and paper mill effluents is measured. While the invention will be described in conjunction with this particular embodiment, it should be understood that many aspects of the invention are not limited to measuring and/or controlling the color of pulp and paper mill effluents. To the contrary, the invention can be applied to a wide variety of applications and it is intended to cover alternatives, modifications, and equivalents as may be included within the spirit and scope of the invention as defined by the appended claims.

Figure 1:
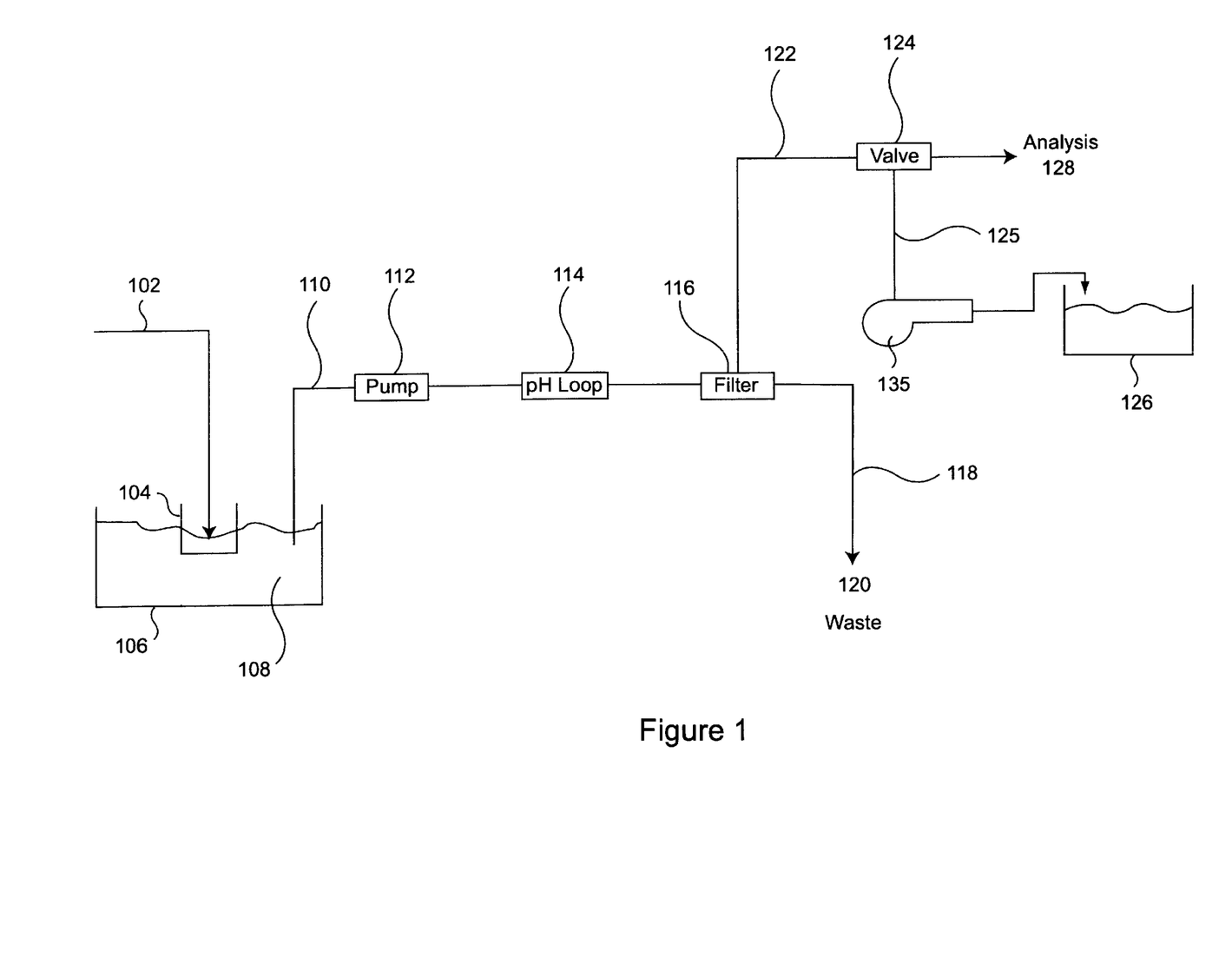
FIG. 1 illustrates automatically processing a sample from a liquid in real time for subsequent analysis.

FIG. 1 illustrates a representative system for automatically processing a liquid sample for subsequent real time analysis and control. Referring now to the left side of FIG. 1, effluent 102 is added to primary clarifier 106 which is filled with waste liquid 108. The effluent may be, for example, from a paper mill, a bleach plant, a waste water treatment facility or a pre-treatment facility or any combination of the forgoing. In other embodiments, the liquid may be a receiving body of water at a waste treatment facility or a pre-treatment facility. In the paper mill example, the effluent 102 may be added to the center well 104 of a primary clarifier 106 which is filled with pulp waste (e.g. black liquor) having varying concentrations. A significant goal of primary clarification is to reduce the Biological Oxygen Demand (BOD), Chemical Oxygen Demand (COD) and total suspended solids from the waste stream by removing (settling) the organic materials. The size of the clarification plants may be widely varied based on the needs of a particular treatment plant. As will be appreciated by those skilled in the art, in some pulping applications, primary clarifiers such as 106 are capable of holding millions of gallons of waste 108.

In the embodiment shown, sample stream 110 is automatically withdrawn by pump 112 from waste 108 located in clarifier 106 in real time. Pump 112 and other associated downstream equipment are typically located above clarifier 106, although this is not a requirement. Pumps may be positioned to withdraw sample from any location in the effluent line or waste stream of a pulp mill, paper mill, bleach plant, waste water facility or pre-treatment facility. In other embodiments, the pump may be positioned to withdraw sample from a receiving body of water at waste treatment facility or a pre-treatment facility. Thus, the placement of the pump in the exemplified embodiment is illustrative rather than restrictive.

The pump may be any suitable pump. By way of example, peristaltic or diaphragm pumps are particularly suited for this application. In one particular embodiment, the pump automatically withdraws sample stream 110 in real time from waste 108 at a rate of between about 6 gallons per minute and about 8 gallons per minute. However, those of skill in the art will recognize that sample can be withdrawn from a waste stream or a plant effluent at widely varying rates.

Sample 110 may be pumped through a pH loop 114 where the pH of stream 110 may be measured and adjusted in real time, if necessary. For example, sample stream 110 may require a pH adjustment to pH 7.6 if direct true color measurements are required ("Standard Methods for the Examination of Water and Waste Water", Environmental Protection Agency). Note that in the exemplified embodiment, pH adjustment is performed prior to filtration of sample stream 110. However, although performing these operations in the order illustrated is preferred, it is not strictly necessary as sample stream 110 may be filtered prior to pH adjustment.

Figure 2:
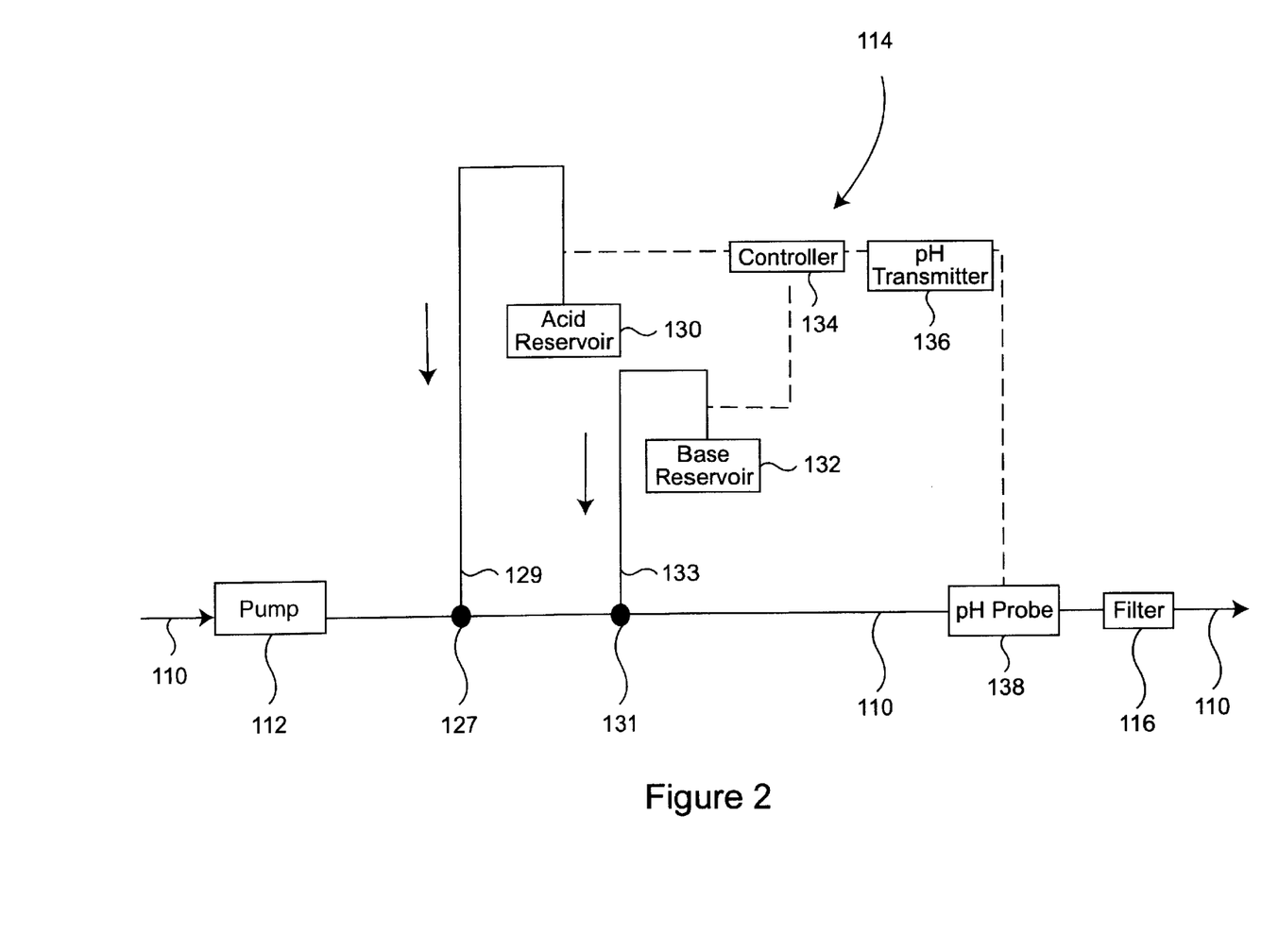
FIG. 2 illustrates an apparatus for automatically determining and adjusting the pH of the sample.

FIG. 2 illustrates one embodiment of a pH loop that may be used in practicing the current invention. Referring to FIG. 2, sample stream 110 passes through pump 112 and continues to filter device 116. Located before filter 116 is a pH probe 138. Probe 138 is connected to pH transmitter 136, which determines the pH of stream 110 and communicates this information to a controller 134. Controller 134 may take any suitable form. By way of example, the controller 134 may take the form of a simple on/off controller, a Proportional Integral Derivative (PID) stand alone controller, a Programmable Logic Device (PLC) that utilizes (PID) control, fuzzy logic or another type of control algorithm or a personal computer. Controller 134, by opening and closing valves 127 and 131, which are connected by lines 129 and 133 to acid reservoir 130 and base reservoir 132 respectively is able to automatically adjust the pH of sample stream 110 in real time. Alternatively, the controller 134 may use other appropriate flow control mechanisms such as proportionally ramping the pump flow rate up or down.

Many applications do not require any adjustment or measurement of the pH of sample stream 110. In these situations, the present invention may be practiced without pH loop 114 and sample stream 110 may proceed directly to filter 116.

Sample stream 110 must be filtered through an appropriate filter if direct true color measurements are required ("Standard Methods for the Examination of Water and Waste Water", Environmental Protection Agency). More specifically, the current standards require filtration through a 0.8 $\mu$m or smaller filter. Of course, the appropriate filter size may vary with the needs of a particular design and/or with changes in the standards. Filtration removes turbid insoluble colloidal materials such as pulp, clay, dispersants, surface active agents, polymers and lime that may significantly affect subsequent analysis of true color content in sample stream 110. For example, these particulate materials can influence true color, generate inaccurate apparent color visible to the naked eye and clog downstream analytical equipment. Any durable filtering system may be used to filter sample stream 110.

Any suitable filtering system 116 may be used to automatically filter the sample stream 110 in real time. In a pilot run of the described invention, a filter system purchased from Collins Product and described in Collins, U.S. Pat. No. 4,693,815 (which is incorporated herein by reference)was used. The Collins filter was found to be particularly useful since it is self-cleaning. Of course, a wide variety of other filtering systems may be used in its place. Other representative filtering systems are described in Holland et al., U.S. Pat. No. 4,112,768, Miller et al., U.S. Pat. No. 5,578,213, Allsing, U.S. Pat. No. 4,956,102 and Rolchigo, U.S. Pat. No. 5,143,630. All of the aforementioned patents are incorporated herein by reference. Filters that produce a shear at the filter membrane/fluid interface have been found to work quite well. It is believed that the shear at the filter membrane reduces migration of particulate into the filter membrane, thereby reducing plugging of the filter which permits less frequent replacement of the filter membranes.

Figure 3:
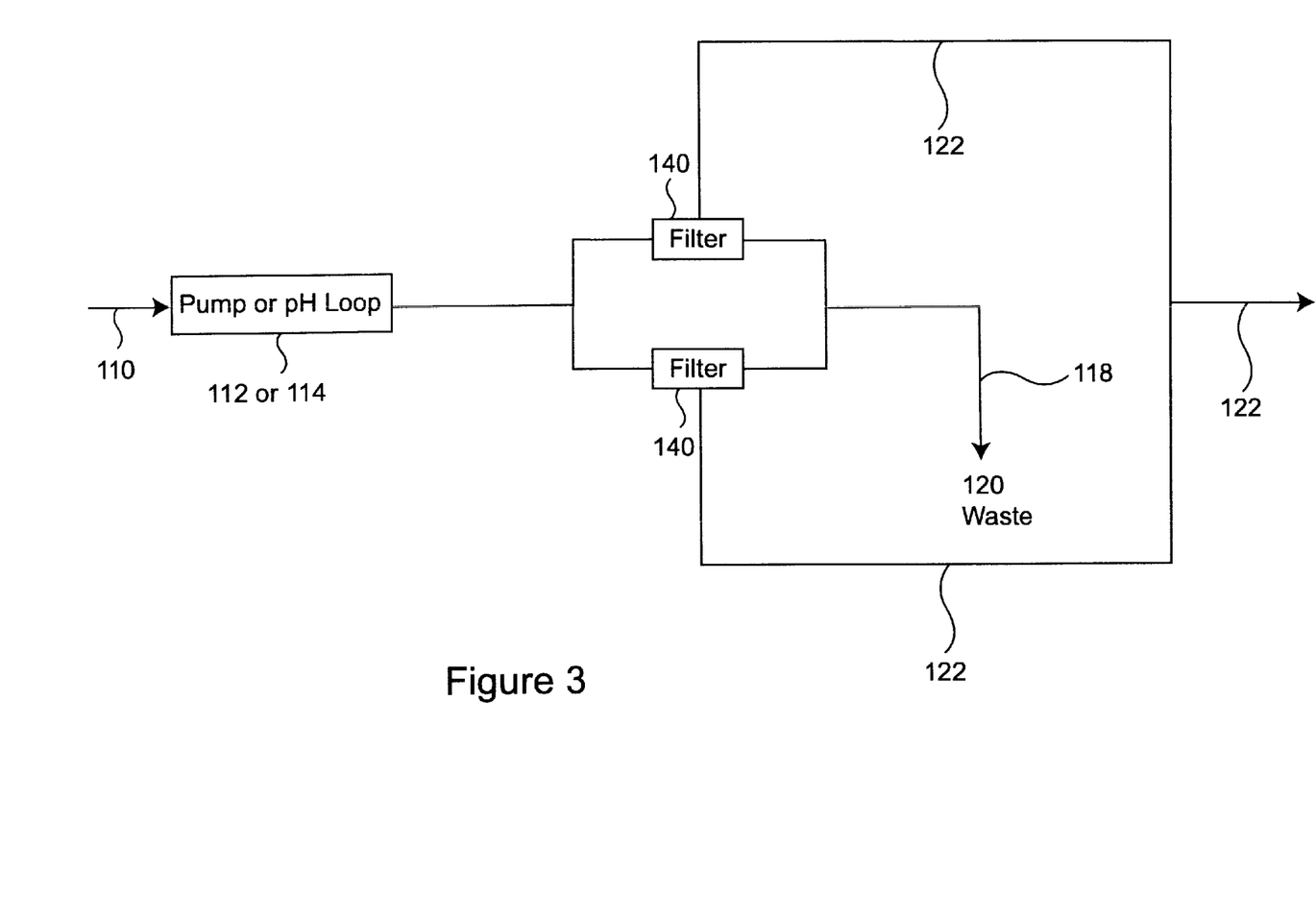
FIG. 3 illustrates a filter system.

Referring now to FIG. 3, sample stream 110, after passing past either pump 112 or pH loop 114, enters the automatic self cleaning filtration apparatus 116 (as for example described in Collins, U.S. Pat. No. 4,693,815). As shown in FIG. 3, filtration apparatus 116 contains 2 filter units 140. The filters 140 contain a Teflon filter membrane with a pore size less than or equal to about 0.8 $\mu$m with a magnetically coupled propeller which spins at between about 3000 rpm and about 3400 rpm that creates shear that prevents particulates from embedding in the filter. Thus, filtration apparatus 116 can be automatically and continuously used to filter sample stream 110 in real time for several weeks without requiring maintenance or replacement and offers significant cost savings over comparable devices In the described embodiment, a major portion of sample stream 110 passes directly through the filter bank 116 without any filtration to provide crude sample stream 118 which is then collected in waste reservoir 120. Waste reservoir may be connected with clarifier 106 in FIG. 1. For example, when the flow rate of sample stream 110 is between about 6 gallons per minute and about 8 gallons per minute, between about 50 mls per minute to about 100 mls per minute of sample stream 110 are filtered through filters 140. Those of skill in the art will recognize that the rate of sample filtration may be widely varied.

Referring now to FIG. 1, a dilute solution of bleach may be periodically introduced from a bleaching reservoir 126 into biologically rich sample stream 122. The bleach prevents micro-organism growth in analysis equipment 128. In one embodiment, bleach may be introduced into filtered sample stream 122 about every two to six hours. The bleach may be introduced using any suitable pump, injecting mechanism or arrangement. In one embodiment, a perastolic pump is used because such pumps work as a check valve. Other biocides or methods such as UV irradiation, organic biocides or ultrasonic cleaning, well known to those of skill in the art, may also be used in place of bleach to prevent micro-organism growth in the analysis equipment 128. Any time a cleaning mechanism (such as bleach) that can affect the color content of the sample stream is used, it is desirable to periodically clean as opposed to continuously clean to reduce skewing of the detected color levels. In the embodiment shown, a valve 124 is used to connect bleach feed line 125 to the sample stream 122. Of course, such a connection can be made using a variety of alternative structures including check valves or simple T connectors.

Figure 4:
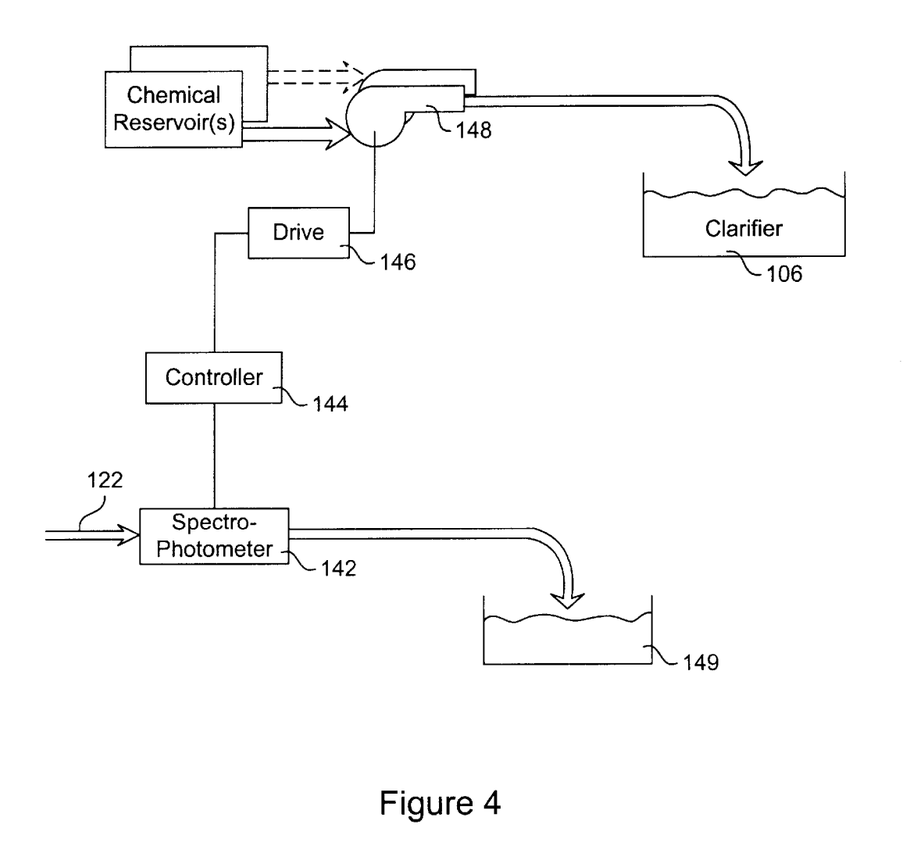
FIG. 4 illustrates automatically monitoring true color content in the sample in real time and feed forward control of the effluent.

Referring now to FIG. 4, the filtered sample stream 122 flows past (or through) an absorption spectrophotometer 142, which automatically monitors the true color of the filtered sample stream 122 in real time. The absorption spectrophotometer 142 may be any suitable on line, in-situ absorption spectrophotometer. At the time of this writing, the recognized standard for use with 10 nm or less spectral bands is a 10 mm absorption cell. However, it should be readily apparent that both the spectral bands and the absorption cell dimensions can be widely varied. By way of example, a Model 5420 photometric analyzer available from Custom Sensors & Technology may be used.

Typically, the on line in-situ absorption spectrophotometer 142 is used to automatically detect true colors in sample stream 122 in a accurate, non destructive manner that obviates the need for the introduction of chemical reagents that may be required by other methods of detecting color either directly or indirectly. As indicated above, a wide variety of spectral bands may be appropriate to detect color. By way of example, in a preferred embodiment, spectrophotometer 142 uses a wavelength between about 400 and 800 nm with a 10 nm or less spectral band to detect the true color of sample stream 122. In a preferred embodiment, wavelengths in the range of about 430 to 460 nm are used. In the described embodiment wavelengths in the range of 450–460 nm as for example 455 nm are used since as of the time of this writing, 455 nm is the recognized standard for detecting "true" color. It should be appreciated that the described filtering of the sample stream 110 prior to the spectrophotometry does not degrade the true color measurement. Sample stream 122 may be passed to waste 148 (or any other suitable location) after absorption measurement by spectrophotometer 142.

In alternative embodiments, multiple wavelength spectrophotometers or other suitable spectrophotometers may be used. When a multiple wavelength photospectrometer is used, sampling wavelengths in the range of 300 to 1100 nm would be appropriate and appropriate correlation would be required.

Generally, a quantitative correlation can be made between the color detected by automated absorption spectroscopy and the chemistry of the source of the sample stream. Using the pulp and paper mill example illustrated in FIG. 1, the color of the sample will relate significantly to the concentration of pulping liquor within the clarifier 106 (which is the source of the sample stream 122). Similarly, in many situations, a quantitative correlation may be made between the detected true color and the degraded lignin content as color bodies of the sample stream 122. This correlation can be used to facilitate real-time control the clarifier chemistry (or other treatment process) itself. By controlling the treatment process, the color of liquids discharged from the clarifier can be effectively controlled in real time.

More specifically, an appropriate controller 144 can be used to control the addition of chemicals to the source of the sample stream. In the pulp mill example, the controller 144 can be used to control one or more pumps 148 that control the addition of chemicals (such aluminum chlorohydrate and branched epichlorohydrin amine condensate) to the clarifier 106. By controlling the clarifier chemistry, the color of effluents discharged from the plant can be effectively controlled.

A wide variety of controllers and control algorithms can be used to control the addition of chemicals to the clarifier 106. By way of example, in the control system illustrated in FIG. 4, the spectrophotometer 142 provides a signal (which may be either a digital or an analog signal) that is indicative of the detected color of the filtered sample stream. The spectrophotometer output is passed to a controller 144 which may take any suitable form including a processor, a programmable logic device, a computer, dedicated controller logic, etc. The controller 144 correlates the signal received from the spectrophotometer (e.g. the detected color) to any needed chemical additions to the clarifier.

As will be apparent to those skilled in the art, the correlation between the detected color and the amount and types of chemicals to be added to the clarifier can be made in a variety of ways. By way of example, in a relatively simple controller, a simple look up table can be used. That is, a look up table can be provided that effectively identifies the amount of a particular chemical that should be added to the clarifier based on the detected true color. In one implementation that contemplates continuous addition of chemicals to the clarifier, the look up table identifies the appropriate magnitude of a signal that is provided to a frequency drive 146 that controls the speed of a chemical pump 148. In other embodiments, the look up table may identify other appropriate values such as the amount of chemical to be added or the length of time that the chemical pump should be run. Of course, as will be readily apparent to those skilled in the art, a wide variety of other controller structures and control algorithms can be used based on the needs of a particular plant. In some systems, there may be a number of chemicals to be added and the control algorithm may be based on several different inputs wherein the spectrophotometer input is just one of the inputs. By way of example, other inputs that may be desirable for control of a particular system may include any of pH, conductivity, clarifier volume, flow, etc.

Automatic real time monitoring of true color in paper and pulp mill effluents as described in the exemplified embodiment, may be used in conjunction with any chemistry for reducing color in paper and pulp mill effluents. However, in a preferred embodiment, color is reduced using the chemistry described below.

A combination of aluminum chlorohydrate and branched epichlorohydrin amine condensate polymers is particularly effective at removing color from lignin containing effluents. The ratio of epichlorohydrin amine condensate to aluminum chlorohydrate in the final product is between about 4:1 to about 2:3. In a preferred embodiment, the ratio of epichlorohydrin amine condensate to aluminum chlorohydrate in the final product is between about 3:2 to about 2:3. In a most preferred embodiment, the ratio of epichlorohydrin amine condensate to aluminum chlorohydrate in the final product is about 1:1. Particularly effective dosages of the 1:1 mixture vary between about 10 ppm to about 120 ppm.

The combination of aluminum chlorohydrate and branched epichlorohydrin amine condensate polymers is non-hazardous and easy to use in the pulp and paper mill environment. The mixture is typically applied at ambient pH (i.e. between about 7.0 to about 11.0) with minimal sludge formation. Importantly, the mixture has minimal effect on the pH of the effluent. Significantly, some mixtures of aluminum chlorohydrate and branched epichlorohydrin amine condensate polymers mixture do not exhibit the resolubilization of color with time that is frequently seen with prior art methods. Thus, color is removed efficiently and permanently when the ratio of epichlorohydrin amine condensate to aluminum chlorohydrate in the final product is between about 3:2 to about 2:3.

The efficiency of color removal generally increases with increasing molecular weight of the branched epichlorohydrin amine condensate polymers. For example, epichlorohydrin dimethylamine branched with hexamethylene diamine and condensed to near gellation produces a polymer with an average molecular weight of 1,000,000, which provides the best results in color reduction. Lower molecular weight ammonia branched epichlorohydrin amine condensate polymers typically provide inferior results.

Dimethyldiallylammonium chloride polymers in conjunction with aluminum chlorohydrate may also be used to reduce color as long as the two component are added separately added to the lignin effluent. Concentrated blends of Dimethyldiallylammonium chloride polymers and aluminum chlorohydrate are unstable and tend to precipitate ("salt" out) over time.

EXAMPLES

The following examples describe specific aspects of the present invention to illustrate the invention and aid those of skill in the art in understanding and practicing the invention. The examples should not be construed as limiting the present invention in any manner.

Example 1

The following experiments were performed to test a 1:1 mixture of epichlorohydrin amine condensate to aluminum chlorohydrate utilizing 930 ml of bleach plant effluent and 70 ml of 60% black liquor (bleached Kraft mill).
Initial color: 1,500 Pt/Co units

| Dose (ppm) | Color (Pt/Co units) |
|---|---|
| 10 | 1350 |
| 20 | 1300 |
| 30 | 1275 |
| 40 | 1100 |
| 50 | 900 |
| 60 | 820 |
| 70 | 750 |
| 80 | 675 |
| 90 | 610 |
| 100 | 460 |
| 120 | 395 |

This example illustrates the effectiveness of the mixture in reducing color of pulp mill effluent. The color reduction generally increases as a function of increasing dosage.

Example 2

Plant trial; 900 tons per day bleached Kraft mill.
Flow=14,000,000 gallons per day
True color=1,450 Pt/Co units.
Dose=100 ppm of a 1:1 mixture of epichlorohydrin amine condensate to aluminum chlorohydrate.
Primary clarifier effluent color=450 Pt/Co units
24 hr. aeration, followed by secondary clarification, True color=250 Pt/Co units This example demonstrates that the chemical method of the current invention can be scaled up to function efficiently in pulp mill.

Although the foregoing invention has been described in some detail to facilitate understanding, it will be apparent that certain changes and modifications may be practiced the scope of the appended claims. For example, sample could be withdrawn at different locations in a pulp or paper mill plant or multiple samples could be withdrawn from multiple locations for subsequent analysis. Accordingly, the described embodiment is to be considered as illustrative and not restrictive, and the invention is not to be limited to the details given herein, but may be modified within the scope and equivalents of the appended claims.

What is claimed is:

1. A method for automatic real time monitoring of true color of a liquid comprising:
automatically withdrawing a sample from the liquid in real time;
automatically filtering the sample in real time; automatically detecting the true color of the filtered sample in real time by in-situ absorption spectrometry of the filtered sample at a wavelength between about 445 nm and about 465 nm; and
automatically quantifying the true color of the filtered sample in real time.

2. The method of claim 1, wherein the true color is detected at a wavelength of about 455 nm.

3. The method of claim 1, wherein the liquid is pulp mill effluent, bleach plant effluent, paper mill effluent, waste water treatment facility effluent or pre-treatment facility effluent.

4. The method of claim 1, wherein the liquid is a receiving body of water at a waste water treatment facility or a pre-treatment facility.

5. The method of claim 1, wherein the detection of true color by in-situ absorption spectrometry provides an indication of the pulping liquor content in the filtered sample.

6. The method of claim 3, wherein the true color is indicative of pulping liquor content in the effluent and/or a bleaching operation, the method further comprising mechanically or chemically controlling pulping liquor concentration or true color effluent.

7. The method of claim 6, wherein the true color is used to scale an analog output that is sent to a controller which mechanically or chemically controls the pulping liquor concentration or true color in the effluent process through an automated feed forward process or an automated feed back process.

8. The method of claim 1, further comprising adjusting the pH of the sample before detecting the true color.

9. The method of claim 8, wherein the pH is adjusted to a pH of about 7.6.

10. A method of automatic real time monitoring of true color in pulp mill effluent, bleach plant effluent, paper mill effluent, pre-treatment facility effluent or waste water treatment facility effluent comprising:
automatically withdrawing a sample from the effluent in real time;
automatically filtering the sample through a filter membrane that has a pore size of less than or equal to about 0.8 $\mu$m in real time; and
automatically detecting and quantifying the true color in the filtered sample by in-situ absorption spectrometry at between about 445 nm and about 465 nm in real time to provide pulping liquor concentration or true color in the effluent.

11. The method of claim 10, further comprising mechanically or chemically controlling the pulping liquor concentration or true color in the effluent through an automated feed forward or a feed back process.

12. The method of claim 11, further comprising periodically passing a biocide over the spectrometer used for in-situ spectrometry to clean optical components of the spectrometer.

13. An apparatus that automatically monitors the true color of a liquid in real time comprising:
a pump for automatically withdrawing a sample from the liquid in real time;
a filter for automatically filtering the sample in real time;
an absorption spectrophotometer for automatically detecting true color in the filtered sample in real time at a wavelength between about 445 nm and about 465 nm;

a controller for automatically quantifying the true color of the filtered sample in real time.

14. The apparatus of claim 13, further comprising a acid reservoir, a base reservoir, a controller and a pH measuring device for automatically measuring and adjusting the pH of the sample.

15. The apparatus of claim 13, further comprising a reservoir for automatically adding a biocide to the filtered sample.

16. The apparatus of claim 13, wherein the filter has a pore size of less than or equal to about 0.8 $\mu$m.

17. The apparatus of claim 13, wherein the filter is an automatic self-cleaning filter.

18. The apparatus of claim 17, wherein the automatic self-cleaning filter has at least two filter units.

* * * * *